US012381377B2

(12) United States Patent
Kawasaki et al.

(10) Patent No.: US 12,381,377 B2
(45) Date of Patent: Aug. 5, 2025

(54) MULTI-CORE CABLE UNTWISTING DEVICE

(71) Applicant: Shinmaywa Industries, Ltd., Takarazuka (JP)

(72) Inventors: Miyuki Kawasaki, Takarazuka (JP); Yoshiki Takahashi, Takarazuka (JP)

(73) Assignee: SHINMAYWA INDUSTRIES, LTD., Hyogo (JP)

(*) Notice: Subject to any disclaimer, the term of this patent is extended or adjusted under 35 U.S.C. 154(b) by 334 days.

(21) Appl. No.: 18/027,642

(22) PCT Filed: Oct. 13, 2021

(86) PCT No.: PCT/JP2021/037935
§ 371 (c)(1),
(2) Date: Mar. 22, 2023

(87) PCT Pub. No.: WO2022/091788
PCT Pub. Date: May 5, 2022

(65) Prior Publication Data
US 2023/0387670 A1    Nov. 30, 2023

(30) Foreign Application Priority Data
Oct. 27, 2020 (JP) .................. 2020-179422

(51) Int. Cl.
H02G 1/00 (2006.01)
H01B 7/00 (2006.01)

(52) U.S. Cl.
CPC ............. *H02G 1/00* (2013.01); *H01B 7/0009* (2013.01)

(58) Field of Classification Search
CPC .......... H02G 1/00; H02G 1/12; H02G 1/1292; H01R 43/033; H01R 43/0335; E04G 21/12
See application file for complete search history.

(56) References Cited

U.S. PATENT DOCUMENTS 3,853,156 A    12/1974 Folkenroth et al.
5,477,718 A    12/1995 Sakamoto et al.
(Continued)

FOREIGN PATENT DOCUMENTS

CN    103106982 A    5/2013
CN    210778042 U    6/2020
(Continued)

OTHER PUBLICATIONS

Official Communication issued in corresponding European Patent Application No. 21885907.2, mailed on Mar. 7, 2024.
(Continued)

*Primary Examiner* — Teresa M Ekiert
(74) *Attorney, Agent, or Firm* — Keating & Bennett, LLP

(57) ABSTRACT

A multi-core cable untwisting device for simultaneously pulling out a sheath while correcting kinks in electric wires, wherein an object is to be able to correct kinks more desirably than with conventional techniques. A multi-core cable untwisting device (1) includes: a retention clamp (11) configured to retain a non-tip portion (5B) of a sheath (5); a gripping clamp (26) configured to grip a sheath tip portion (5A); a pull-out device (30) configured to pull out the sheath tip portion (5A) by moving the gripping clamp (26); a rotating device (40) configured to rotate the gripping clamp (26); and a control device (50) configured to control the pull-out device (30) and the rotating device (40). The control device (50) is configured to perform a first control of pulling out the sheath tip portion (5A) without rotating the sheath tip portion (5A), and a second control of pulling out the sheath tip portion (5A) while rotating the sheath tip portion (5A).

9 Claims, 9 Drawing Sheets

(56) References Cited

U.S. PATENT DOCUMENTS

| | | | |
|---|---|---|---|
| 5,787,574 A | 8/1998 | Watanabe | |
| 2014/0331636 A1* | 11/2014 | Keil | H01B 13/0207 57/73 |
| 2017/0125988 A1* | 5/2017 | Appenzeller | H02G 1/12 |

FOREIGN PATENT DOCUMENTS

| | | | |
|---|---|---|---|
| EP | 2513364 A1 | 10/2012 | |
| EP | 3205312 A1 | 8/2017 | |
| GB | 1379531 A | 1/1975 | |
| JP | S4961681 A | 6/1974 | |
| JP | 3-120622 U | 12/1991 | |
| JP | 05-168120 A | 7/1993 | |
| JP | 6-13321 U | 2/1994 | |
| JP | H06325635 A | 11/1994 | |
| JP | H08336219 A | 12/1996 | |
| WO | 2011073730 A1 | 6/2011 | |

OTHER PUBLICATIONS

Official Communication issued in International Patent Application No. PCT/JP2021/037935, mailed on Dec. 7, 2021.
Official Communication issued in corresponding Chinese Patent Application No. 202180066451.3, mailed on May 9, 2025, 5 pages.

* cited by examiner

MULTI-CORE CABLE UNTWISTING DEVICE

TECHNICAL FIELD

The present invention relates to a multi-core cable untwisting device for pulling out a sheath at the end of a multi-core cable while correcting kinks in electric wires in the sheath.

BACKGROUND ART

A conventional multi-core cable is known in the art that has a plurality of electric wires and a sheath covering those wires. For a multi-core cable, the process of making a cut in the tip portion of the sheath, and the process of pulling out the tip portion of the sheath to expose the tip portion of the electric wires are performed. Then, for example, the process of crimping a terminal onto the tip portion of the electric wire, etc., is performed. However, if kinks remain in the electric wires when the tip portion of the sheath is pulled out, the subsequent processes for the electric wires cannot be done desirably. In view of this, devices for correcting kinks in electric wires have been proposed in the art.

Utility Model Application Publication No. 3-120622 discloses an electric wire untwisting device for simultaneously untwisting electric wires while pulling out the sheath. This electric wire untwisting device has a retention member for retaining a sheath-unpeeled portion of a multi-core cable and a gripping means for gripping the sheath to be peeled off. The gripping means includes an upper member and a lower member for gripping the sheath by clamping. When pulling out the sheath, the gripping means moves away from the retention member, and at the same time, the upper member and the lower member move in opposite directions to each other in the left-right direction. Thus, the sheath is pulled out while being rotated.

CITATION LIST

Patent Literature

PTL 1: Utility Model Application Publication No. 3-120622

SUMMARY OF INVENTION

Technical Problem

The total amount of rotation of the sheath can be set in advance according to the twist pitch of the electric wires twisted in the sheath. Where the strip length of the sheath is L [mm] and the total amount of rotation of the sheath is α [degrees], the sheath to be pulled out will be rotated by α [degrees] while the sheath moves by the distance L [mm] in the axial direction of the multi-core cable. If the sheath is pulled out at a constant speed and rotated at a constant rotational speed, the amount of rotation per unit travel distance of the sheath is α/L [degrees/mm].

However, as a result of a test by the present inventors, when the sheath is pulled out at a constant speed and rotated at a constant rotational speed, the twist in the electric wire may not be corrected sufficiently, such as when the sheath to be pulled out is long, for example.

The present invention has been made in view of this problem, and an object of the present invention is to provide a multi-core cable untwisting device for simultaneously pulling out a sheath while correcting kinks in electric wires, wherein the kinks can be corrected more desirably than with conventional techniques.

Solution to Problem

A multi-core cable untwisting device according to the present invention is a multi-core cable untwisting device for pulling out a tip portion of a sheath of a multi-core cable, which includes a plurality of electric wires and the sheath that covers the electric wires, while correcting kinks in the electric wires. The untwisting device includes: a retention member configured to retain a non-tip portion of the sheath that has a cut between the tip portion and the non-tip portion; a gripping member configured to grip the tip portion of the sheath; a pull-out device configured to pull out the tip portion of the sheath by moving at least one of the gripping member and the retention member so that the gripping member moves away from the retention member; a rotating device configured to relatively rotate the tip portion of the sheath that is gripped by the gripping member and the non-tip portion of the sheath; and a control device configured to control the pull-out device and the rotating device. The control device is configured to perform a first control and a second control from start until end of the pulling-out of the tip portion of the sheath, wherein the first control is to control the pull-out device and the rotating device so that the amount of rotation per unit travel distance of the tip portion of the sheath is smaller than a predetermined amount of rotation, and the second control is to control the pull-out device and the rotating device so that the amount of rotation per unit travel distance of the tip portion of the sheath is equal to or greater than the predetermined amount of rotation. Note that the phrase " . . . is smaller than a predetermined amount of rotation" includes cases where the amount of rotation is zero (in other words, no rotation).

With a multi-core cable, when pulling out the sheath, the electric wires are pulled by receiving a frictional force from the sheath. However, because of the kinks in the electric wires in the sheath, the electric wires come into close contact with each other as the electric wires are pulled. Where the electric wires are in close contact with each other, the kinks are not corrected sufficiently even by rotating the sheath in the opposite direction to the direction in which the electric wires are twisted if the amount of rotation per unit travel distance is relatively small.

With the untwisting device described above, however, the first control and the second control are performed from the start until the end of the pulling-out of the tip portion of the sheath. In the second control, the amount of rotation per unit travel distance of the tip portion of the sheath is relatively large. For example, where the strip length of the sheath is L [mm] and the total amount of rotation of the sheath is α [degrees], the amount of rotation per unit travel distance of the sheath in the second control is larger than α/L [degrees/mm]. Therefore, with the untwisting device described above, it is possible to correct kinks better than with conventional techniques. On the other hand, in the first control the amount of rotation per unit travel distance of the tip portion of the sheath is relatively small or zero. Therefore, the total amount of rotation of the tip portion of the sheath will not be too large from the start until the end of the pulling-out. Thus, it is possible to avoid excessively rotating the tip portion of the sheath, and the process will not create new kinks in the reverse direction in the electric wires.

In one preferred embodiment, the control device is configured to pull out the tip portion of the sheath without rotating the tip portion of the sheath in the first control, and to pull out the tip portion of the sheath while rotating the tip portion of the sheath in the second control.

With the embodiment described above, the tip portion of the sheath is not rotated in the first control, and the amount of rotation per unit travel distance of the tip portion of the sheath can be increased accordingly in the second control. Therefore, it is possible to avoid excessively rotating the tip portion of the sheath, and it is possible to desirably correct the kinks.

In one preferred embodiment, the control device is configured to perform the second control after the first control.

With the embodiment described above, it is possible to desirably pull out the tip portion of the sheath, and it is possible to desirably correct the kinks in the electric wires.

In one preferred embodiment, the control device is configured to repeat the first control and the second control for two iterations or more from start until end of the pulling-out of the tip portion of the sheath.

With the untwisting device described above, it is possible to desirably correct the kinks in the electric wires when performing the second control, and in this process, kinks can be corrected more effectively for portions of the electric wires that are closer to a portion of the sheath that is gripped by the gripping device. With the embodiment described above, the first control and the second control are performed repeatedly for two iterations or more. Therefore, the process of effectively correcting the kinks can be performed frequently. Thus, it is possible to more desirably correct the kinks.

In one preferred embodiment, a pull-out length of the first control is equal between different iterations and/or a pull-out length of the second control is equal between different iterations.

With the embodiment described above, the first control and/or the second control are simplified.

In one preferred embodiment, a total pull-out length of the tip portion of the sheath in an $n^{th}$ iteration (where n is a predetermined natural number) of the first control and the second control is shorter than a total pull-out length of the tip portion of the sheath in an $m^{th}$ iteration (where m is a predetermined natural number other than n) of the first control and the second control. The amount of rotation of the tip portion of the sheath in the $n^{th}$ iteration of the second control is smaller than the amount of rotation of the tip portion of the sheath in the $m^{th}$ iteration of the second control.

With the embodiment described above, the amount of rotation per unit travel distance of the tip portion of the sheath can be made relatively even between the $n^{th}$ iteration of the first control and the second control and the $m^{th}$ iteration of the first control and the second control. Thus, the kinks in the electric wires can be corrected relatively evenly between the $n^{th}$ iteration and the $m^{th}$ iteration of the first control and the second control.

In one preferred embodiment, $\alpha_n/L_n = \alpha_{n+1}/L_{n+1}$ holds, where $L_n$ is a total pull-out length of the tip portion of the sheath in an $n^{th}$ iteration (where n is a predetermined natural number) of the first control and the second control, $\alpha_n$ is the amount of rotation of the tip portion of the sheath in the $n^{th}$ iteration of the second control, $L_{n+1}$ is a total pull-out length of the tip portion of the sheath in an n+1th iteration of the first control and the second control, and $\alpha_{n+1}$ is the amount of rotation of the tip portion of the sheath in the $n+1^{th}$ iteration of the second control.

With the embodiment described above, the amount of rotation per unit travel distance of the tip portion of the sheath is equal between the $n^{th}$ iteration of the first control and the second control and the $n+1^{th}$ iteration of the first control and the second control. Thus, the kinks in the electric wires can be corrected evenly between the $n^{th}$ iteration and the $n+1^{th}$ iteration of the first control and the second control.

In one preferred embodiment, the rotating device includes an actuator configured to rotate the gripping member.

With the embodiment described above, it is possible to stably rotate the tip portion of the sheath, and it is possible to stably perform at least the second control. Regardless of the amount of rotation of the tip portion of the sheath, the gripping member can be made smaller.

In one preferred embodiment, the control device is configured to pull out the tip portion of the sheath by 60 mm or more from the start until the end of the pulling-out of the tip portion of the sheath.

Typically, the longer the pull-out length of tip portion of the sheath, the more difficult it is to correct the kinds in the electric wires. With the embodiment described above, the effect of the present invention of correcting the kinks more desirably than with conventional techniques is more pronounced.

Effects of Invention

According to the present invention, there is provided a multi-core cable untwisting device for simultaneously pulling out a sheath while correcting kinks in electric wires, wherein the kinks can be corrected more desirably than with conventional techniques.

DESCRIPTION OF EMBODIMENTS

Figure 1:
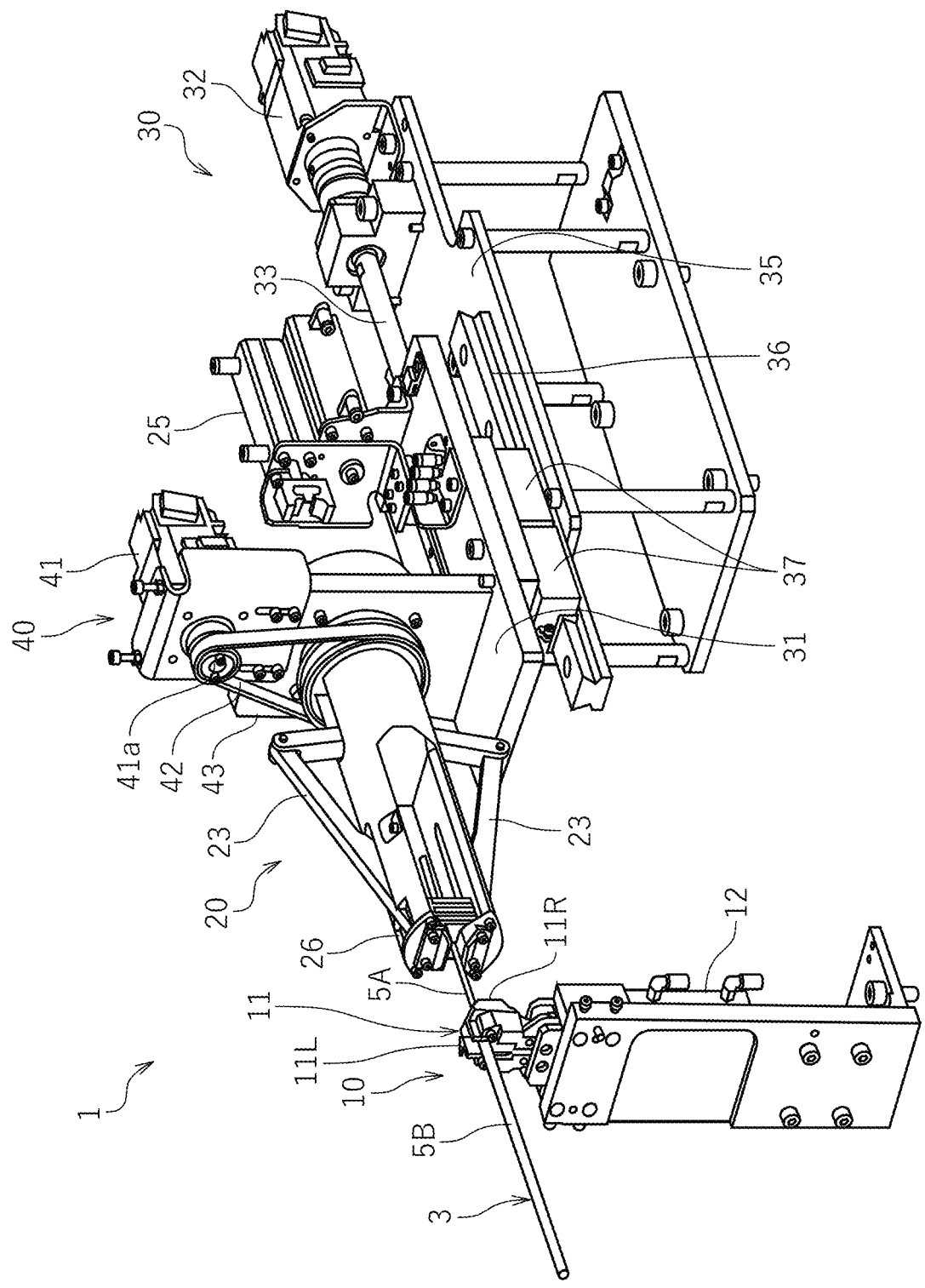
FIG. 1 is a perspective view of a multi-core cable untwisting device according to one embodiment.
Figure 2:
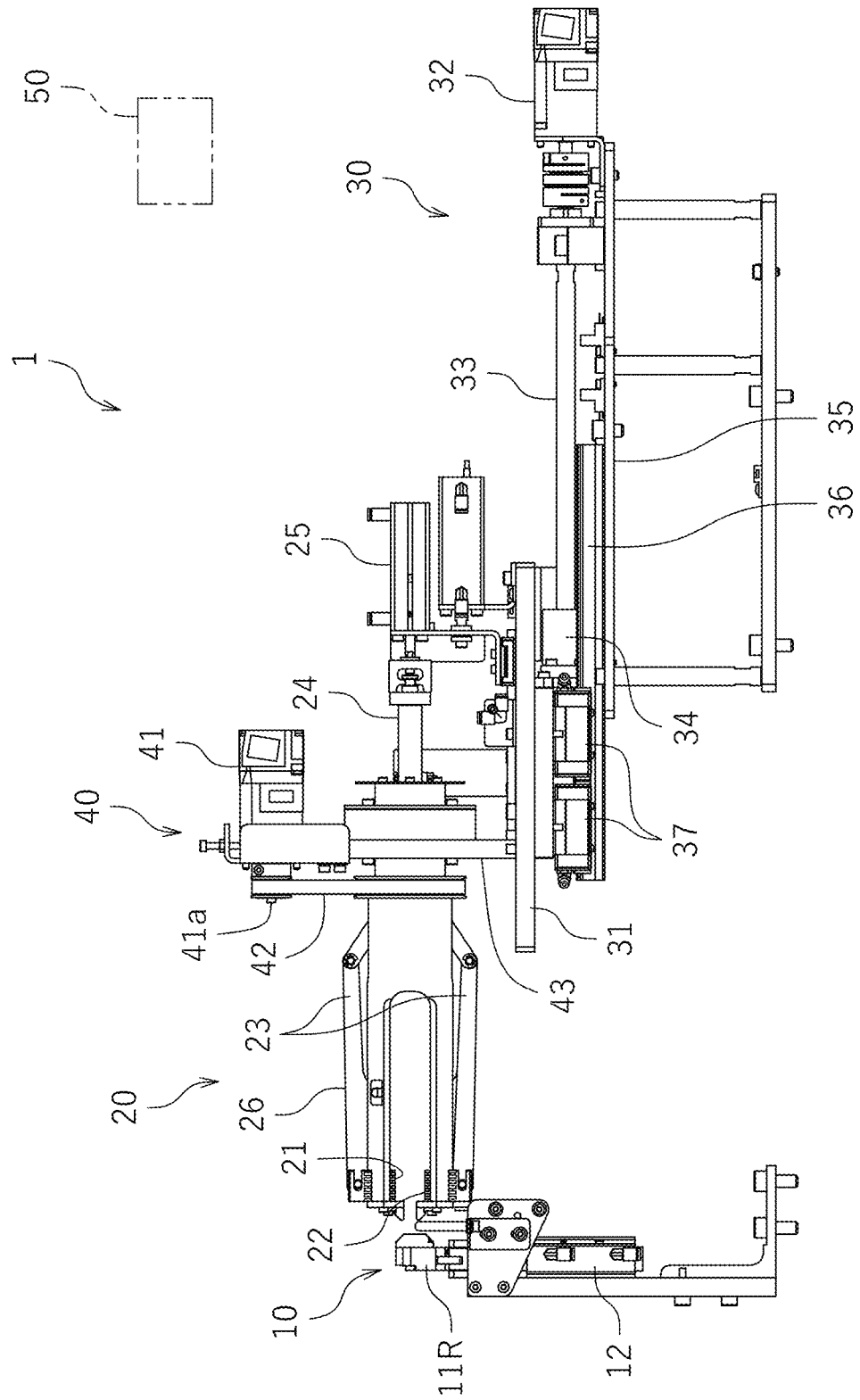
FIG. 2 is a side view of the untwisting device.
Figure 3:
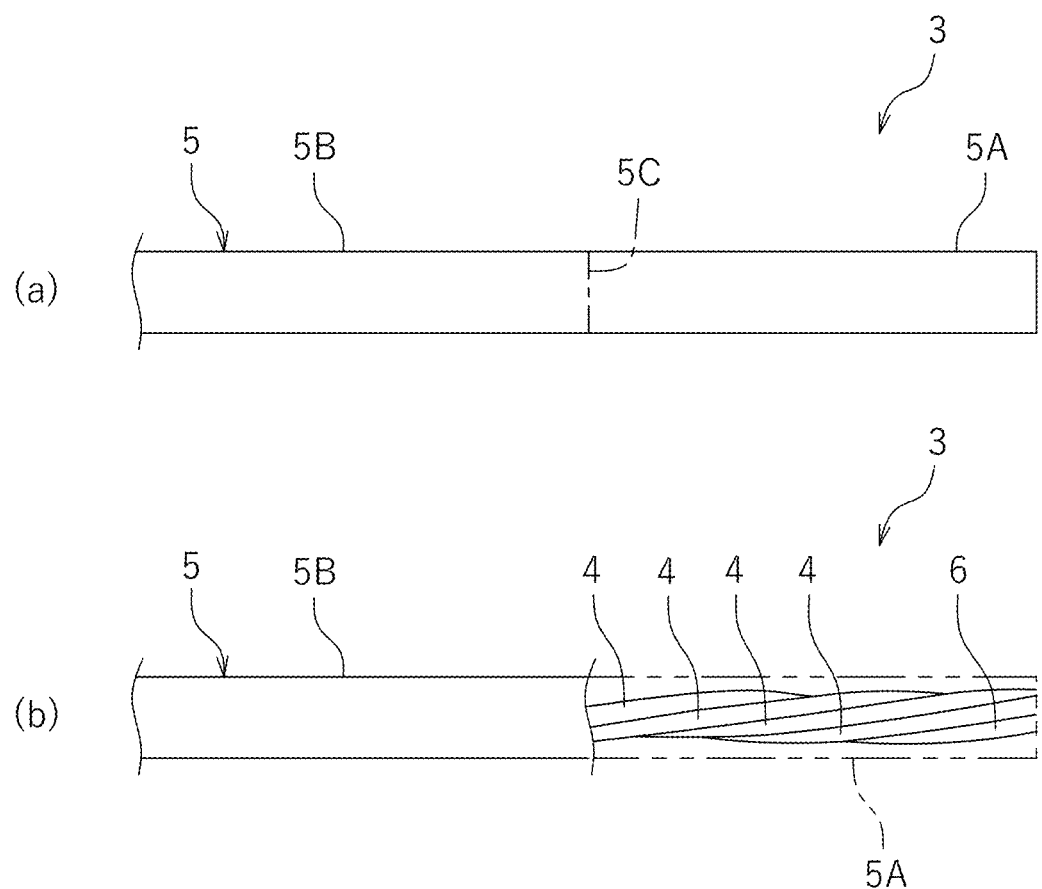
FIG. 3(a) is a plan view of a multi-core cable.
FIG. 3(b) is a plan view of the multi-core cable showing the inside of a tip portion.

A multi-core cable untwisting device (hereinafter referred to simply as an "untwisting device") according to one embodiment of the present invention will be described with reference to the drawings. FIG. 1 is a perspective view of an untwisting device 1, and FIG. 2 is a side view of the untwisting device 1. FIG. 3(a) is a plan view of a multi-core cable 3, and FIG. 3(b) is a plan view showing the inside of a tip portion of the multi-core cable 3.

As shown in FIG. 3(a) and FIG. 3(b), the multi-core cable 3 includes a plurality of covered electric wires 4, one uncovered electric wire 6, and a sheath 5 covering these wires 4, 6. Although not shown in the figures, the electric wire 6 includes a plurality of strands made of a conductor such as a metal. The electric wires 4 each include a plurality of strands made of a conductive material such as a metal, and a cover covering those strands that is made of an insulating material such as a synthetic resin. Hereafter, the covered electric wires 4 and the uncovered electric wire 6 are referred to as core wires and a drain wire, respectively. Here, the multi-core cable 3 includes four core wires 4. Note however that there is no particular limitation on the number of core wires 4. Also, there is no particular limitation on the number of drain wires 6. While there is no particular limitation on the material of the sheath 5, it may be chloroprene rubber, polyvinyl chloride, polyethylene, etc., for example.

As shown in FIG. 3(a), the sheath 5 of the multi-core cable 3 to be processed by the untwisting device 1 has a cut (also called a slit) 5C in advance. By the cut 5C, the sheath 5 is severed into a tip portion (hereinafter referred to as the sheath tip portion) 5A and a non-tip portion 5B. As shown in FIG. 3(b), the core wires 4 and the drain wire 6 are twisted in the sheath 5. That is, the core wires 4 and the drain wire 6 in the sheath 5 extend in spiral and are kinked. The untwisting device 1 pulls out the sheath tip portion 5A while correcting the kinks in the core wires 4 and the drain wire 6 to be exposed.

As shown in FIG. 1, the untwisting device 1 includes a retention device 10 for retaining the non-tip portion 5B of the sheath 5 of the multi-core cable 3, a gripping device 20 for gripping the sheath tip portion 5A, a pull-out device 30 for pulling out the sheath tip portion 5A, and a rotating device 40 for rotating the sheath tip portion 5A. As shown in FIG. 2, the untwisting device 1 includes a control device 50 for controlling the retention device 10, the gripping device 20, the pull-out device 30 and the rotating device 40. In the following description, for the purpose of discussion, the tip portion 5A side of the sheath 5 (the right side of FIG. 2) will be referred to as the front side and the non-tip portion 5B side (the left side of FIG. 2) as the rear side. The sheath tip portion 5A is pulled out forward.

As shown in FIG. 1, the retention device 10 includes a retention clamp 11 having a pair of left and right clamp jaws 11L, 11R, and an actuator 12 that drives the clamp jaws 11L, 11R toward and away from each other. While there is no particular limitation on the actuator 12, the actuator 12 is herein an air cylinder. When the clamp jaws 11L, 11R are moved toward each other, the retention clamp 11 is closed. Then, the non-tip portion 5B of the sheath 5 is held by being clamped between the clamp jaws 11L, 11R. When the clamp jaws 11L, 11R are moved away from each other, the retention clamp 11 is opened. Then, the retention of the non-tip portion 5B of the sheath 5 is released.

The gripping device 20 includes a gripping clamp 26 and an actuator 25 that opens and closes the gripping clamp 26.

Figure 4:
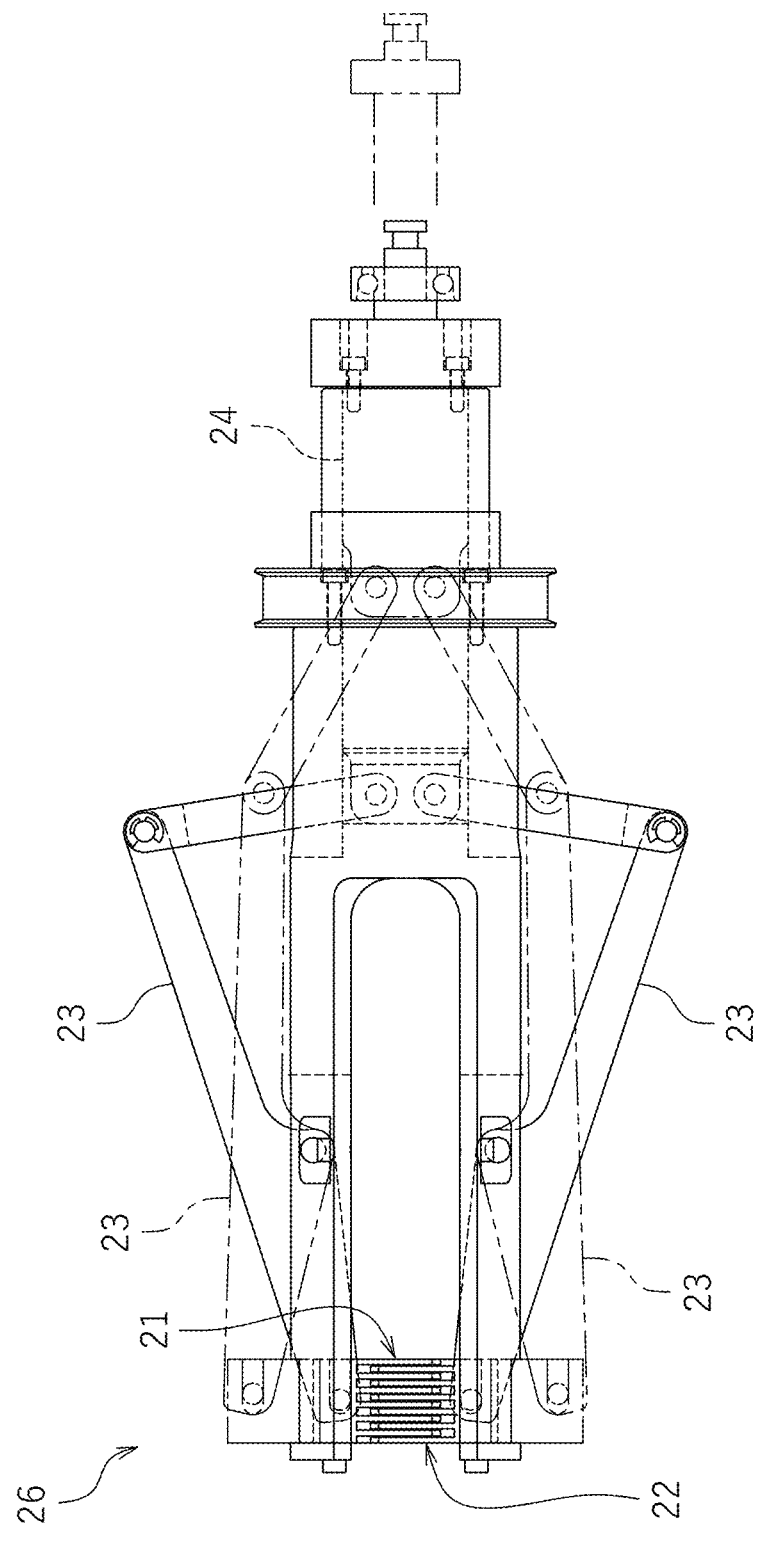
FIG. 4 is a side view of a gripping clamp.
Figure 5:
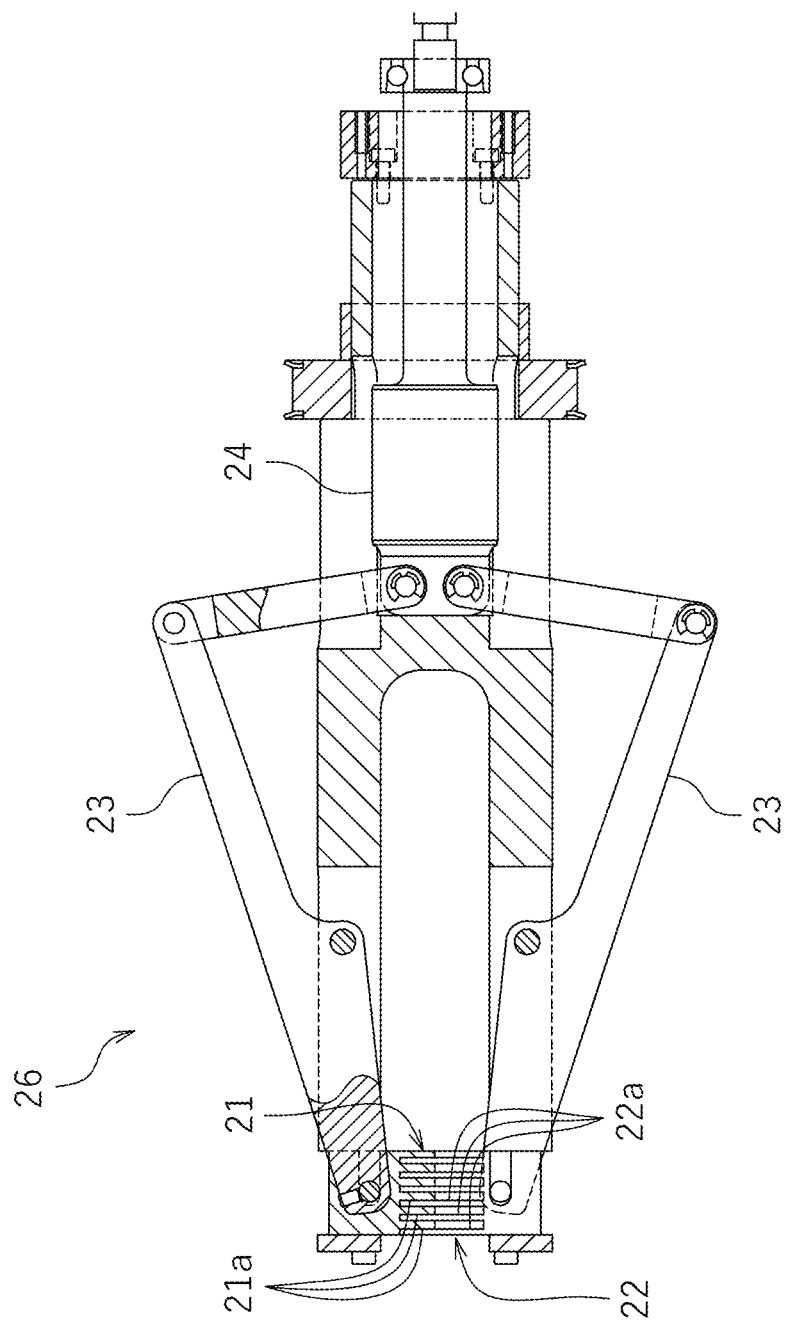
FIG. 5 is a cross-sectional view of the gripping clamp.
Figure 6:
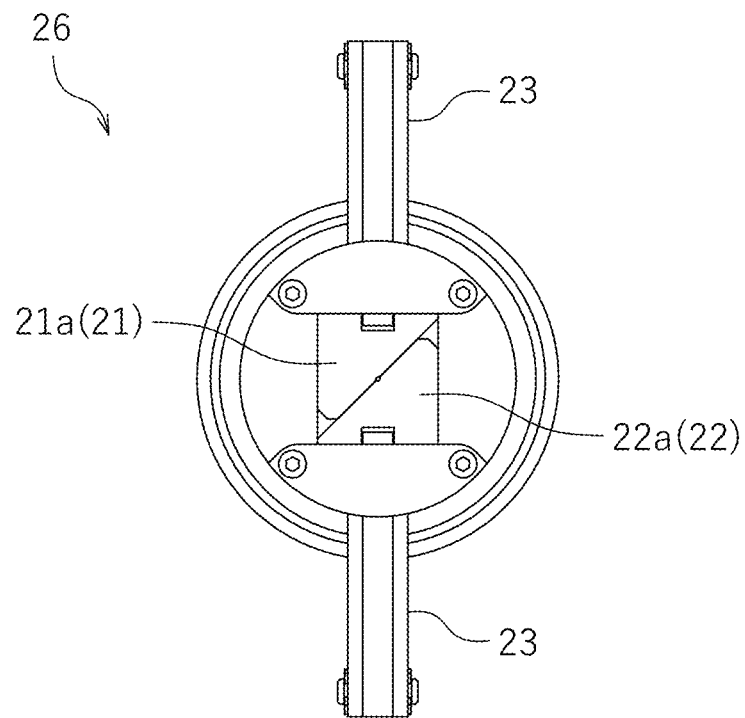
FIG. 6 is a front view of the gripping clamp.

FIG. 4 is a side view of the gripping clamp 26, and FIG. 5 is a cross-sectional view of the gripping clamp 26. FIG. 6 is a front view of the gripping clamp 26. The gripping clamp 26 includes a first clamp jaw 21 and a second clamp jaw 22. The first clamp jaw 21 and the second clamp jaw 22 oppose each other so that the sheath tip portion 5A can be gripped.

Here, the first clamp jaw 21 includes a plurality of triangular plate members 21a arranged in the front-rear direction (see FIG. 5 and FIG. 6). The second clamp jaw 22 includes a plurality of triangular plate members 22a arranged in the front-rear direction. The plate member 21a and the plate member 22a are arranged alternating with each other in the front-rear direction. Note that the configuration of the first clamp jaw 21 and the second clamp jaw 22 described herein is merely an example. There is no particular limitation on the configuration of the first clamp jaw 21 and the second clamp jaw 22 as long as the sheath tip portion 5A can be gripped.

When the first clamp jaw 21 and the second clamp jaw 22 are moved toward each other, the sheath tip portion 5A is clamped by the first clamp jaw 21 and the second clamp jaw 22. As a result, the sheath tip portion 5A is gripped by the first clamp jaw 21 and the second clamp jaw 22. When the first clamp jaw 21 and the second clamp jaw 22 are moved away from each other, the grip of the sheath tip portion 5A is released.

As shown in FIG. 5, the gripping clamp 26 includes a link mechanism 23 that is linked to the first clamp jaw 21 and the second clamp jaw 22, and a piston rod 24 linked to the link mechanism 23. As shown in FIG. 2, the piston rod 24 is linked to the actuator 25. While there is no particular limitation on the actuator 25, it is herein an air cylinder. The piston rod 24 is rotatably linked to the actuator 25. As shown in FIG. 2, when the actuator 25 moves the piston rod 24 forward (rightward in FIG. 2), the first clamp jaw 21 and the second clamp jaw 22 move away from each other. That is, when the piston rod 24 is extended forward, the gripping clamp 26 is opened, thereby releasing the grip of the gripping clamp 26. On the other hand, as shown in FIG. 4 and FIG. 5, when the actuator 25 moves the piston rod 24 rearward, the first clamp jaw 21 and the second clamp jaw 22 move toward each other. That is, when the piston rod 24 contracts, the gripping clamp 26 is closed, and the gripping clamp 26 grips the sheath tip portion 5A. Note that the solid line in FIG. 4 represents the state in which the gripping clamp 26 is closed, and the two-dot-chain line represents the state in which the gripping clamp 26 is open. Thus, the gripping clamp 26 is opened and closed by the actuator 25. Note that the piston rod 24 is not shown in FIG. 1.

As shown in FIG. 1, the rotating device 40 includes a support plate 43 that rotatably supports the gripping clamp 26 and a motor 41 that gives a torque to the gripping clamp 26. The motor 41 is supported by the support plate 43. A rotary shaft 41a of the motor 41 and the gripping clamp 26 are linked together by a belt 42. The belt 42 is a transmission member that transmits the power of the motor 41 to the gripping clamp 26. Note however that the transmission member is not limited to the belt 42, but may be a transmission member of any other form such as a gear, a chain, or the like. While the motor 41 is an example of an actuator that gives a torque to the gripping clamp 26, the actuator that provides a torque to the gripping clamp 26 is not limited to the motor 41. In the present embodiment, the rotating device 40 is configured to rotate the sheath tip portion 5A by rotating the gripping clamp 26.

The pull-out device 30 is configured to pull out the sheath tip portion 5A by moving the gripping clamp 26 away from the retention clamp 11 along the longitudinal direction of the multi-core cable 3. The pull-out device 30 includes a movable base 31 that supports the gripping device 20 and the rotating device 40, a motor 32 that moves the movable base 31 forward and rearward, and a fixed base 35 that supports the movable base 31 and the motor 32. A rail 36 that extends in the front-back direction is provided on the fixed base 35.

A slider 37 that slidably engages with the rail 36 is fixed to the lower right portion of the movable base 31. A ball screw 33 is connected to the motor 32. As shown in FIG. 2, a slider 34 that engages with the ball screw 33 is fixed to the lower left portion of the movable base 31. The slider 34 has a hole (not shown) into which the ball screw 33 is inserted. The inner circumference of this hole has a spiral groove formed thereon that engages with the ball screw 33. When the motor 32 rotates in one direction, the ball screw 33 rotates in the same direction and the slider 34 moves forward. As a result, the gripping clamp 26 moves forward. When the motor 32 rotates in the opposite direction, the ball screw 33 also rotates in the opposite direction and the slider 34 moves rearward. As a result, the gripping clamp 26 moves rearward. Thus, as the motor 32 rotates in one direction or in the opposite direction, the gripping clamp 26 moves forward or rearward.

Figure 7:
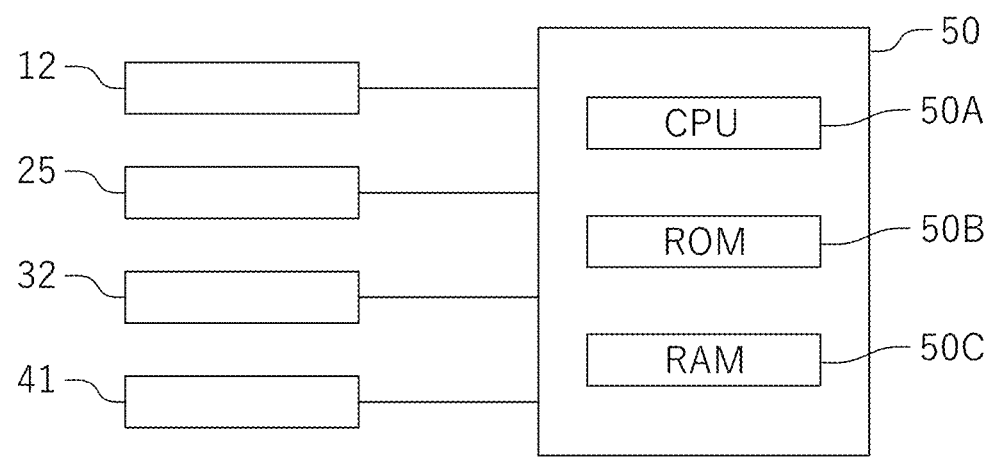
FIG. 7 is a block diagram of a control device and actuators.

The control device 50 controls the retention device 10, the gripping device 20, the pull-out device 30 and the rotating device 40. As shown in FIG. 7, the control device 50 is a computer including a CPU 50A, a ROM 50B, a RAM 50C, etc. The control device 50 is communicatively connected to the actuator 12 of the retention device 10, the actuator 25 of the gripping device 20, the motor 32 of the pull-out device 30, and the motor 41 of the rotating device 40. The control device 50 may be a dedicated computer for the untwisting device 1 or a general-purpose computer such as a personal computer.

Figure 8:
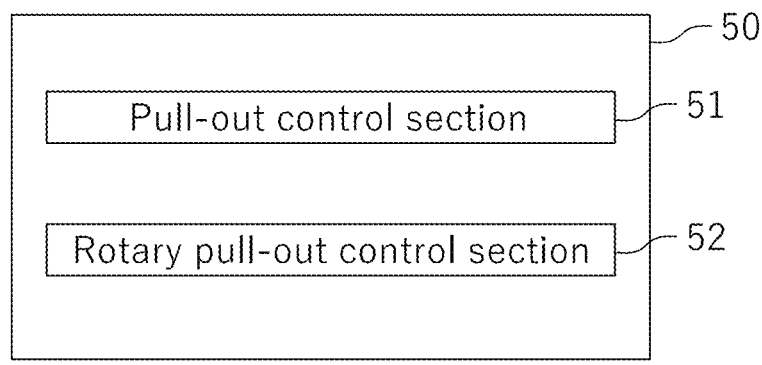
FIG. 8 is a functional block diagram of the control device.

FIG. 8 is a functional block diagram of the control device 50. The control device 50 functions as a pull-out control section 51 and a rotary pull-out control section 52 as follows by executing a computer program stored in the ROM 50B or an external storage device, etc.

The pull-out control section 51 performs a control (hereinafter referred to as "first control") of pulling out the sheath tip portion 5A without rotating the sheath tip portion 5A. Specifically, the pull-out control section 51 drives the motor 32 of the pull-out device 30 while stopping the motor 41 of the rotation device 40. As a result, the gripping clamp 26, which grips the sheath tip portion 5A, moves forward without rotating.

The rotary pull-out control section 52 performs a control of pulling out the sheath tip portion 5A while rotating it (hereinafter referred to as "second control"). Specifically, the rotary pull-out control section 52 drives the motor 32 of the pull-out device 30 while driving the motor 41 of the rotating device 40. Then, the gripping clamp 26, which grips the sheath tip portion 5A, moves forward while rotating. The second control is performed following the first control. In the present embodiment, the first control and the second control are repeated a plurality of times from the start until the end of the pulling-out of the sheath tip portion 5A. Note that the direction in which the core wires 4 and the drain wire 6 in the sheath 5 are twisted (hereinafter referred to as the twist direction) is known in advance. In the second control, the sheath tip portion 5A is rotated in the opposite direction to the twist direction of the core wires 4 and the drain wire 6.

The untwisting device 1 is configured as described above. Next, the method for pulling out the sheath tip portion 5A using the untwisting device 1 will be described. In the following description, the method of pulling out the sheath tip portion 5A at a constant speed while rotating the sheath tip portion 5A at a constant rotation angle from the start until the end of the pulling-out of the sheath tip portion 5A will be called the "conventional method". The pull-out method of the present embodiment will be explained in contrast to the conventional method.

Let L [mm] be the length of the sheath tip portion 5A to be pulled out (i.e., the strip length), and α [degrees] be the total amount of rotation of the sheath tip portion 5A from the start until the end of the pulling-out. In the conventional method, the sheath tip portion 5A moves forward at a constant speed while rotating at a constant rotation angle from the start until the end of the pulling-out, so the amount of rotation per unit travel distance of the sheath tip portion 5A is α/L [degrees/mm]. For example, where L=80 [mm] and α=960 [degrees], the sheath tip portion 5A is pulled out while rotating under α/L=12 [degrees/mm].

Figure 9:
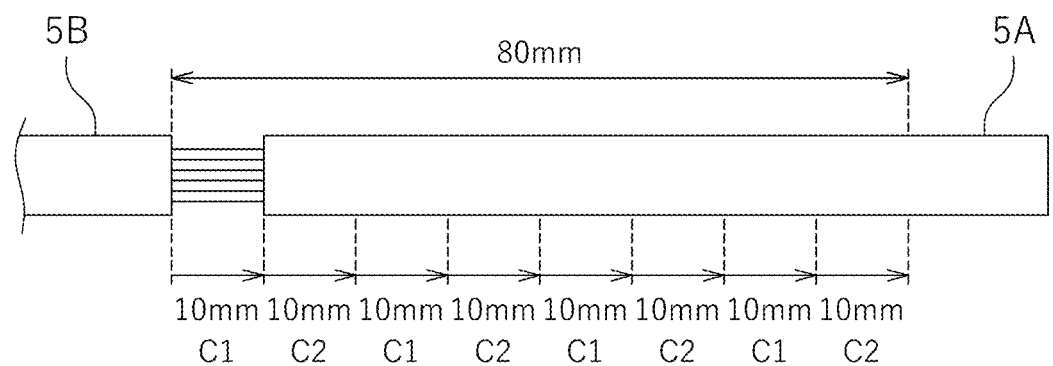
FIG. 9 is a diagram showing the relationship between the sheath tip portion pull-out sections and the control performed in those sections in one embodiment.

On the other hand, in the present embodiment, as shown in FIG. 9, the period from the start until the end of the pulling-out of the sheath tip portion 5A is divided into eight sections, and the first control and the second control are repeated four times. The symbols C1 and C2 in the figures represent sections where the first control and the second control are performed, respectively. In the first control, the sheath tip portion 5A is pulled out 10 mm at a constant speed without rotation. In the second control, the sheath tip portion 5A is pulled out at a constant speed while rotating the sheath tip portion 5A at a constant speed as with the conventional method. However, in the present embodiment, the total amount of rotation α=960 [degrees] is made by performing the second control a total of four times, so the amount of rotation per iteration of the second control is 960/4=240 [degrees]. The amount of rotation α/L per unit travel distance in the second control is 240/10=24 [degrees/mm], which is twice that of the conventional method.

Figure 10:
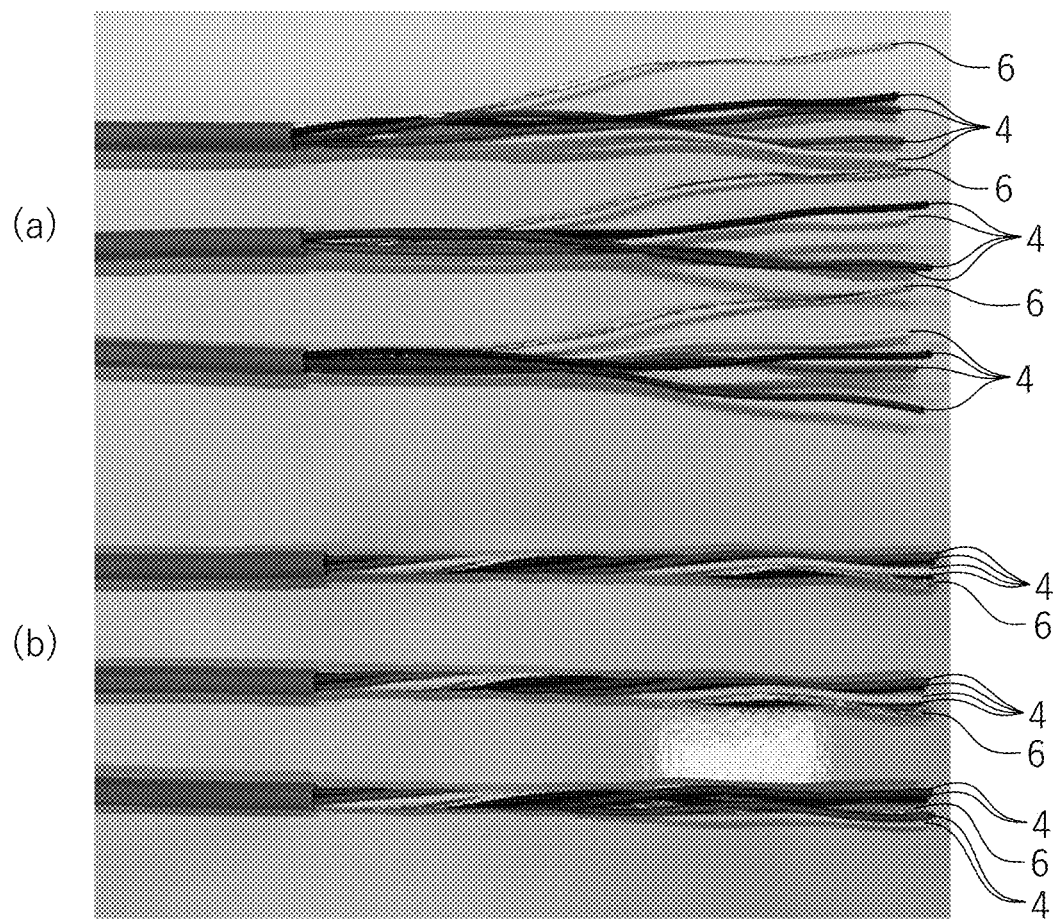
FIG. 10(a) is a photograph showing a sample of a multi-core cable of which the sheath tip portion has been pulled out by the method of the embodiment.
FIG. 10(b) is a photograph showing a sample of a multi-core cable of which the sheath tip portion has been pulled out by a conventional method.

FIG. 10(a) represents three sample multi-core cables where the sheath tip portion 5A is pulled out by the method according to the present embodiment. FIG. 10(b) represents three sample multi-core cables where the sheath tip portion 5A is pulled out by the conventional method. As can be seen from the comparison between FIG. 10(a) and FIG. 10(b), according to the present embodiment, the kinks in the core wires 4 and the drain wire 6 are corrected more desirably than with conventional techniques.

With the multi-core cable 3, a frictional force is generated between the sheath tip portion 5A and the core wires 4 and between the sheath tip portion 5A and the drain wire 6. As the sheath tip portion 5A is rotated, this frictional force transmits a torque on the core wires 4 and the drain wire 6, thereby correcting kinks. However, since the sheath tip portion 5A is pulled forward, the core wires 4 and the drain wire 6 are also pulled forward by the frictional force. Here, since the core wires 4 and the drain wire 6 are twisted, they come into close contact with each other when pulled. If the core wires 4 and the drain wire 6 are in close contact with each other, it is assumed that the kinks in the core wires 4 and the drain wire 6 cannot be corrected sufficiently unless the sheath tip portion 5A is rotated relatively significantly. In the conventional method, it is assumed that the kinks in the core wires 4 and the drain wire 6 cannot be corrected sufficiently because the amount of rotation per unit travel distance of the sheath tip portion 5A is relatively small.

In contrast, in the present embodiment, the first control and the second control are performed, and the amount of rotation per unit travel distance of the sheath tip portion 5A is relatively large in the second control. The torque per unit travel distance in the second control is twice that of the conventional method. Therefore, it is assumed that the kinks in the core wires 4 and the drain wire 6 were corrected sufficiently. Note that while it is possible to rotate the sheath tip portion 5A without pulling out the sheath tip portion 5A, the core wires 4 and the drain wire 6 may bulge outward in the radial direction from the center of rotation, resulting in buckling, depending on the operating conditions of the device. However, in the second control, the sheath tip portion 5A is rotated while being pulled out. Therefore, it is possible to prevent the buckling of the core wires 4 and the drain wire 6.

Now, one may consider increasing the amount of rotation per unit travel distance in the conventional method. For example, one may consider setting it to α/L=24 [degrees/mm] in the conventional method. In that case, however, the total amount of rotation of the sheath tip portion 5A is 24 [degrees/mm]×80 [mm]=1920 degrees. The total amount of rotation is twice as large. However, if the total amount of rotation is too large, the core wires 4 and the drain wire 6 may be untwisted excessively in the opposite direction to the twist direction, thereby lowering the quality of the core wires 4 and the drain wire 6. There is a risk of creating new kinks in the core wires 4 and the drain wire 6 in the opposite direction. On the other hand, according to the present embodiment, the sheath tip portion 5A is not rotated in the first control. Therefore, even if the amount of rotation per unit travel distance in the second control is relatively large, the total amount of rotation of the sheath tip portion 5A is not too large.

According to the present embodiment, the sheath tip portion 5A can be pulled out desirably and the kinks in the core wires 4 and the drain wire 6 can be corrected desirably without detracting from the quality of the core wires 4 and the drain wire 6. According to the present embodiment, as with the conventional method, it is possible to simultaneously pull out the sheath tip portion 5A while correcting the core wires 4 and the drain wire 6, and it is therefore possible to shorten the cycle time for processing the multi-core cable 3. In addition, according to the present embodiment, the kinks in the core wires 4 and the drain wire 6 can be corrected more desirably than with conventional techniques, and it is therefore possible to desirably perform subsequent processes on the core wires 4 and the drain wire 6. It becomes easier to automate subsequent processes for the core wires 4 and the drain wire 6.

Now, if the sheath tip portion 5A is rotated when the sheath tip portion 5A is in the vicinity of the tip of the core wires 4 and the drain wire 6, the near-tip portions of the core wires 4 and the drain wire 6 can be untwisted but the base portions cannot be untwisted. Such a tendency is pronounced particularly when the strip length is long. In the present embodiment, however, the first control and the second control are repeated a plurality of times. Therefore, the core wires 4 and the drain wire 6 can be untwisted frequently from the start until the end of the pulling-out of the sheath tip portion 5A. In the second control, the kinks can be corrected intensively for the portion where the sheath tip portion 5A has been pulled out in the first control. For example, during the first iteration of the second control, the base portions of the core wires 4 and the drain wire 6 can be untwisted sufficiently. During the fourth iteration of the second control, the tip portions of the core wires 4 and the drain wire 6 can be untwisted sufficiently. Therefore, even when the strip length is long, the kinks in the core wires 4 and the drain wire 6 can be corrected desirably.

In the present embodiment, the sheath tip portion 5A is pulled at the same speed in the first control and the second control. The pull-out speed of the sheath tip portion 5A in the first control is equal to the pull-out speed of the sheath tip portion 5A in the second control. That is, the moving speed of the gripping clamp 26 in the first control is equal to the moving speed of the gripping clamp 26 in the second control. Therefore, there is no change in the moving speed of the sheath tip portion 5A when transitioning from the first control to the second control and when transitioning from the second control to the first control. Thus, the sheath tip portion 5A can be pulled out stably.

In the present embodiment, the pull-out length is 10 mm both in the first control and in the second control. The pull-out length in the first control is equal to the pull-out length in the second control. Thus, it is possible to desirably pull out the sheath tip portion 5A, and it is possible to more desirably correct the kinks in the core wires 4 and the drain wire 6.

In the present embodiment, the pull-out length is 10 mm in any of the first to fourth iterations of the first control. The pull-out length is 10 mm in any of the first to fourth iterations of the second control. The pull-out length of the first control is equal between different iterations. The pull-out length of the second control is equal between different iterations. This simplifies the first control and the second control. It is also possible to evenly untwist the core wires 4 and the drain wire 6.

With the untwisting device 1 according to the present embodiment, the rotating device 40 is configured to rotate the gripping clamp 26. The sheath tip portion 5A is rotated by rotating the gripping clamp 26, which grips the sheath tip portion 5A. Therefore, it is possible to stably rotate the sheath tip portion 5A. Therefore, it is possible to stably perform the first control and the second control. With the configuration in which the sheath tip portion is rotated by moving the upper member and the lower member, which clamp the sheath, in opposite directions (see Utility Model Application Publication No. 3-120622), there is a need to ensure a sufficient dimension (i.e., the length in the moving direction) of the upper member and the lower member taking into account the amount of rotation of sheath tip portion. Therefore, if the amount of rotation of the sheath tip portion is large, the upper member and the lower member become larger. On the other hand, with the rotating device 40 according to the present embodiment, the gripping clamp 26 does not become larger even if the amount of rotation of the sheath tip portion 5A is large. Thus, regardless of the amount of rotation of the sheath tip portion 5A, the gripping clamp 26 can be made smaller.

Note that, in the untwisting device 1, there is no particular limitation on the travel distance of the gripping clamp 26 when pulling out the sheath tip portion 5A. In other words, there is no particular limitation on the length of the sheath tip portion 5A to be pulled out (the strip length). Note however that, typically, the longer the strip length, the more difficult it is to correct the kinks in the core wires 4 and the drain wire 6. Therefore, the longer the strip length of the multi-core cable 3, the more pronounced the effect of the untwisting device 1 according to the present embodiment, i.e., the effect of desirably correcting the kinks in the core wires 4 and the drain wire 6. For example, when the strip length is 60 mm or more, the untwisting device 1 according to the present embodiment is particularly effective. The control device 50 may be configured to pull out the sheath tip portion 5A by 60 mm or more from the start until the end of the pulling-out of the sheath tip portion 5A.

While one embodiment of the present invention has been described above, the embodiment is merely an example and various other embodiments are possible. Next, examples of other embodiments will be described.

Figure 11:
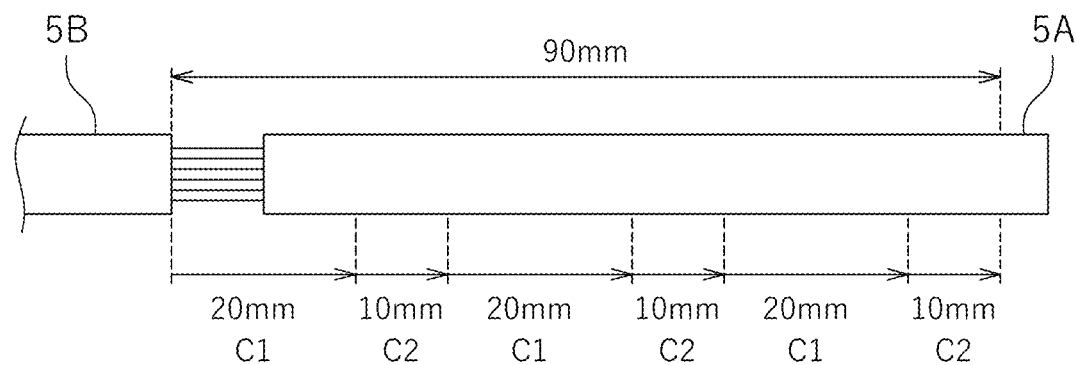
FIG. 11 is a diagram showing the relationship between the sheath tip portion pull-out sections and the control performed in those sections in another embodiment.

In the embodiment described above, the pull-out length in the first control and the pull-out length in the second control are equal, both being 10 mm. However, the pull-out length in the first control and the pull-out length in the second control may be different. For example, as shown in FIG. 11, when the strip length is 90 mm, the pull-out length in the first control may be 20 mm and the pull-out length in the second control may be 10 mm. In this case, the pull-out length in the second control (=10 mm) is ⅓ of the total pull-out length in the first control and the second control (=30 mm). The amount of rotation in the second control can be set as desired. For example, the amount of rotation per unit travel distance $\alpha/L$ in the second control may be three times the amount of rotation per unit travel distance $\alpha/L$ according to the conventional method. Note that the pull-out length in the first control may be longer or shorter than the pull-out length in the second control.

Figure 12:
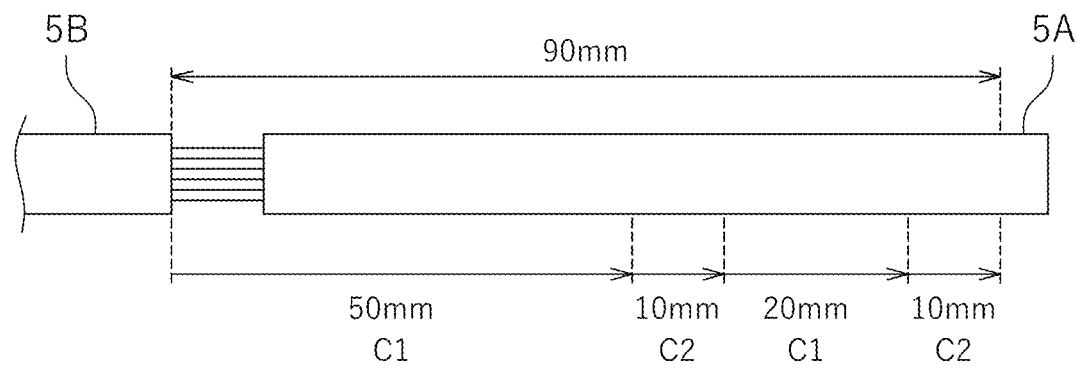
FIG. 12 is a diagram showing the relationship between the sheath tip portion pull-out sections and the control performed in those sections in another embodiment.

In the embodiment described above (see FIG. 9), the pull-out length is equal in each iteration of the first control and the pull-out length is equal in each iteration of the second control. For example, the pull-out length of the first iteration of the first control is 10 mm, and the pull-out length of the second iteration of the first control is 10 mm. However, the pull-out length may differ between a plurality of iterations of the first control. The pull-out length may also differ between a plurality of iterations of the second control. For example, as shown in FIG. 12, the pull-out length of the first iteration of the first control may be 50 mm, and the pull-out length of the second iteration of the first control may be 20 mm.

Where the first control and the second control are performed for a plurality of iterations, the amount of rotation per unit travel distance $\alpha/L$ may be constant for different iterations. Thus, it is possible to evenly correct the kinks in the core wires 4 and the drain wire 6. $\alpha_n/L_n = \alpha_{n+1}/L_{n+1}$ may hold, where n is a predetermined natural number, $L_n$ is the total pull-out length for the $n^{th}$ iteration of the first control and the second control, $\alpha_n$ is the amount of rotation of the $n^{th}$ iteration of the second control, $L_{n+1}$ is the total pull-out length for the $n+1^{th}$ iteration of the first control and the second control, and $\alpha_{n+1}$ is the amount of rotation of the $n+1^{th}$ iteration of the second control. For example, in the example shown in FIG. 12, since L1=60 mm and L2=30 mm, $\alpha1/60 = \alpha2/30$ may be set. Then, $\alpha2 = 0.5 \times \alpha1$.

In the example described above, L2 is shorter than L1, and $\alpha2$ is smaller than $\alpha1$. Thus, where the first control and the second control are performed for a plurality of iterations, the amount of rotation may be set to be smaller as the total pull-out length for each iteration is shorter. Where the total pull-out length of the $n^{th}$ iteration of the first control and the second control is shorter than the total pull-out length of the $m^{th}$ iteration (where m is a predetermined natural number other than n) of the first control and the second control, the amount of rotation of the $n^{th}$ iteration of the second control may be smaller than the amount of rotation of the $m^{th}$ iteration of the second control. Thus, the kinks in the core wires 4 and the drain wire 6 can be corrected relatively evenly.

The pull-out speed may be equal or may differ between the first control and the second control. The pull-out speed may differ between iterations of the first control. The pull-out speed may difference between iterations of the second control. For example, the pull-out speed may become higher or lower for later iterations.

The first control and the second control may be performed only for one iteration. For example, for the multi-core cable 3 with a short strip length, the kinks in the core wires 4 and the drain wire 6 can be corrected desirably even if the first control and the second control are performed only for one iteration.

While the first control is performed immediately after the start of the pulling-out of the sheath tip portion 5A in the embodiment described above, the second control may be performed immediately after the start of the pulling-out.

While the sheath tip portion 5A is not rotated in the first control in the embodiment described above, the sheath tip portion 5A may be pulled out while being rotated in the first control. Where the total amount of rotation of the sheath tip portion 5A is constant, the amount of rotation per unit travel distance $\alpha/L$ in the second control can be made larger than with conventional techniques by making the amount of rotation per unit travel distance $\alpha/L$ in the first control smaller than with conventional techniques. For example, in the first control, the sheath tip portion 5A is pulled out while being rotated at the first rotation speed, and in the second control, the sheath tip portion 5A is pulled out while being rotated at the second rotation speed greater than the first rotation speed. Even with such a control, $\alpha/L$ in the second control can be made larger than with the conventional method. Therefore, the kinks in the core wires 4 and the drain wire 6 can be corrected more desirably than with the conventional method.

Only the first control and the second control may be performed from the start until the end of the pulling-out of the sheath tip portion 5A, or other controls may be performed in addition to the first control and the second control. For example, immediately after the start of the pulling-out of the sheath tip portion 5A, a control may be performed to pull out the sheath tip portion 5A while rotating the sheath tip portion 5A in the same direction as the twist direction of the core wires 4 and the drain wire 6, and the first control and the second control may be performed thereafter. Note that while the sheath tip portion 5A is pulled out while being rotated in the second control, the rotation direction in this operation is the opposite direction to the twist direction of the core wires 4 and the drain wire 6.

There is no particular limitation on the method for rotating the sheath tip portion 5A. There is no particular limitation on the configuration for rotating the sheath tip portion 5A. For example, the gripping clamp 26 may include a pair of upper and lower clamp members, and these clamp members may be configured to move in opposite directions to each other in the left-right direction while clamping the sheath tip portion 5A. In this case, the sheath tip portion 5A is rotated by being rolled by the pair of upper and lower clamp members.

In the embodiment described above, the sheath tip portion 5A is rotated while the non-tip portion 5B of the sheath 5 is held stationary. However, it is sufficient to be able to rotate the sheath tip portion 5A relative to the non-tip portion 5B, and there is no particular limitation on the configuration and operation of the rotating device. The non-tip portion 5B of the sheath 5 may be rotated while not rotating the sheath tip portion 5A. Both the sheath tip portion 5A and the non-tip portion 5B may be rotated in opposite directions of each other.

There is no particular limitation on the configuration of the gripping clamp 26. The gripping clamp 26 may include any configuration capable of gripping the sheath tip portion 5A. For example, the gripping clamp 26 may be provided with a pair of plate-like members that grip the sheath tip portion 5A instead of the first clamp jaw 21 and the second clamp jaw 22.

In the present embodiment, the multi-core cable 3 includes four core wires 4 and one drain wire 6. However, there is no particular limitation on the number of core wires 4 and the number of drain wires 6. The drain wire 6 may not be necessary. The multi-core cable 3 may include a plurality of covered electric wires and include no uncovered electric wire. The multi-core cable 3 may include a plurality of uncovered electric wires and include no covered electric wire.

In the embodiment described above, the pull-out device 30 is configured to pull out the sheath tip portion 5A by moving the gripping clamp 26. However, the pull-out device 30 may be configured to pull out the sheath tip portion 5A by moving the retention clamp 11 away from the gripping clamp 26. The pull-out device 30 may also be configured to pull out the sheath tip portion 5A by moving both the gripping clamp 26 and the retention clamp 11 so that the gripping clamp 26 moves away from the retention clamp 11.

The configuration of the untwisting device 1 according to the embodiment described above is merely an example. Any device capable of performing the first control and the second control described above may be used as the untwisting device.

DESCRIPTION OF REFERENCE SIGNS

1 Multi-core cable untwisting device
3 Multi-core cable
4 Covered electric wire (core wire)
5 Sheath
5A Tip portion of sheath
5B Non-tip portion of sheath
6 Uncovered electric wire (drain wire)
10 Retention device
11 Retention clamp (retention member)
12 Actuator
20 Gripping device
25 Actuator
26 Gripping clamp (gripping member)
30 Pull-out device
32 Motor
40 Rotating device
41 Motor (actuator)
50 Control device

The invention claimed is:

1. A multi-core cable untwisting device for pulling out a tip portion of a sheath of a multi-core cable, which includes a plurality of electric wires and the sheath that covers the electric wires, while correcting kinks in the electric wires, the multi-core cable untwisting device comprising:
   a retention member configured to retain a non-tip portion of the sheath that has a cut between the tip portion and the non-tip portion;
   a gripping member configured to grip the tip portion of the sheath;
   a pull-out device configured to pull out the tip portion of the sheath by moving at least one of the gripping member and the retention member so that the gripping member moves away from the retention member;
   a rotating device configured to relatively rotate the tip portion of the sheath that is gripped by the gripping member and the non-tip portion of the sheath; and
   a control device configured to control the pull-out device and the rotating device,
   wherein the control device is configured to perform a first control and a second control from start until end of the pulling-out of the tip portion of the sheath, wherein the first control is to control the pull-out device and the rotating device so that the amount of rotation per unit travel distance of the tip portion of the sheath is smaller than a predetermined amount of rotation, and the second control is to control the pull-out device and the rotating device so that the amount of rotation per unit travel distance of the tip portion of the sheath is equal to or greater than the predetermined amount of rotation.

2. The multi-core cable untwisting device according to claim 1, wherein the control device is configured to pull out the tip portion of the sheath without rotating the tip portion of the sheath in the first control, and to pull out the tip portion of the sheath while rotating the tip portion of the sheath in the second control.

3. The multi-core cable untwisting device according to claim 1, wherein the control device is configured to perform the second control after the first control.

4. The multi-core cable untwisting device according to claim 1, wherein the control device is configured to repeat the first control and the second control for two iterations or more from start until end of the pulling-out of the tip portion of the sheath.

5. The multi-core cable untwisting device according to claim 4, wherein a pull-out length of the first control is equal between different iterations and/or a pull-out length of the second control is equal between different iterations.

6. The multi-core cable untwisting device according to claim 4, wherein:
   a total pull-out length of the tip portion of the sheath in an $n^{th}$ iteration (where n is a predetermined natural number) of the first control and the second control is shorter than a total pull-out length of the tip portion of the sheath in an $m^{th}$ iteration (where m is a predetermined natural number other than n) of the first control and the second control; and
   the amount of rotation of the tip portion of the sheath in the $n^{th}$ iteration of the second control is smaller than the amount of rotation of the tip portion of the sheath in the $m^{th}$ iteration of the second control.

7. The multi-core cable untwisting device according to claim 4, wherein $\alpha_n/L_n = \alpha_{n+1}/L_{n+1}$ holds, where $L_n$ is a total pull-out length of the tip portion of the sheath in an $n^{th}$ iteration (where n is a predetermined natural number) of the first control and the second control, $\alpha_n$ is the amount of rotation of the tip portion of the sheath in the $n^{th}$ iteration of the second control, $L_{n+1}$ is a total pull-out length of the tip portion of the sheath in an $n+1^{th}$ iteration of the first control and the second control, and $\alpha_{n+1}$ is the amount of rotation of the tip portion of the sheath in the $n+1^{th}$ iteration of the second control.

8. The multi-core cable untwisting device according to claim 1, wherein the rotating device includes an actuator configured to rotate the gripping member.

9. The multi-core cable untwisting device according to claim 1, wherein the control device is configured to pull out the tip portion of the sheath by 60 mm or more from the start until the end of the pulling-out of the tip portion of the sheath.

* * * * *